United States Patent [19]

Chang et al.

[11] 4,114,596

[45] Sep. 19, 1978

[54] METHOD AND APPARATUS FOR TRACKING THE SUN FOR USE IN A SOLAR COLLECTOR WITH LINEAR FOCUSING MEANS

[76] Inventors: Wei-Yi Chang; Chen-Yen Cheng, both of 9605 La Playa St, NE., Albuquerque, N. Mex. 87111

[21] Appl. No.: 667,408

[22] Filed: Mar. 16, 1976

[51] Int. Cl.² .............................. F24J 3/02; G02B 5/10
[52] U.S. Cl. .................... 126/270; 126/271; 350/320; 350/293
[58] Field of Search ............... 126/270, 271; 350/292, 350/293, 190, 167, 320, 296; 353/3; 237/1 A; 136/206

[56] References Cited

U.S. PATENT DOCUMENTS

| 1,946,184 | 2/1934 | Abbot ................................. 350/299 |
| 1,951,404 | 3/1934 | Goddard ......................... 126/270 G |

*Primary Examiner*—Paul A. Sacher
*Assistant Examiner*—Rodney B. Bovernick

[57] ABSTRACT

The invention introduces a coplanar rotational method of tracking the sun for use in a focusing solar collector that comprises of one or more linear focusing means such as cylindrical parabolic mirrors and linear lenses. Such a solar collector has one or more linear focal regions. It is particularly advantageous to use this tracking method in a large panel collector having multitude of linear focusing means. A plane parallel to the linear focal region or regions and perpendicular to the front plane of a solar collector is denoted as a focal plane. In applying the tracking method to the solar collector, the collector is rotated around an axis perpendicular to the front plane so that the sun'rays become parallel to the focal plane. The front plane remains substantially on the same plane during the tracking operation.

4 Claims, 13 Drawing Figures

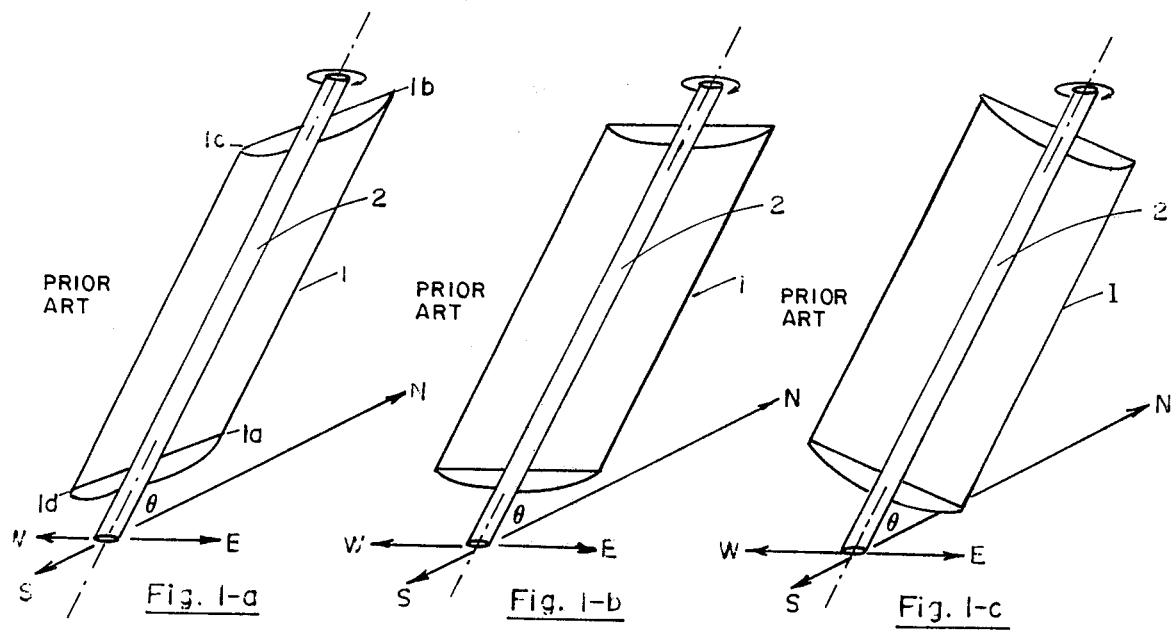
Fig. 1-a    Fig. 1-b    Fig. 1-c
PRIOR ART
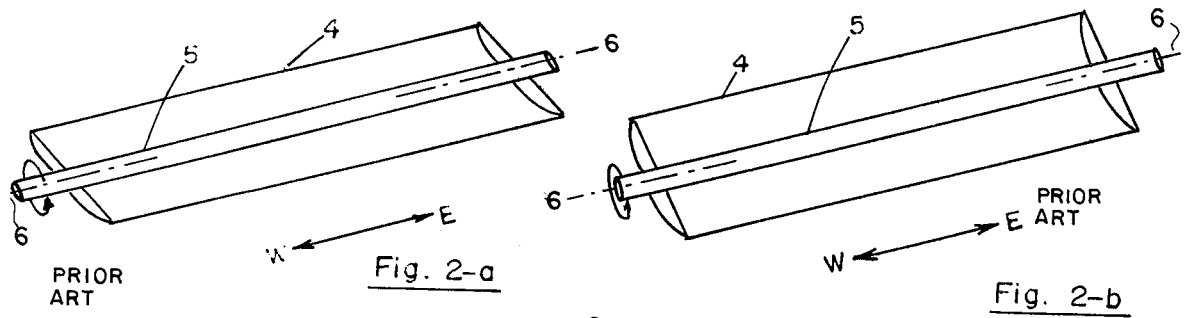
Fig. 2-a    Fig. 2-b
PRIOR ART
Fig. 3
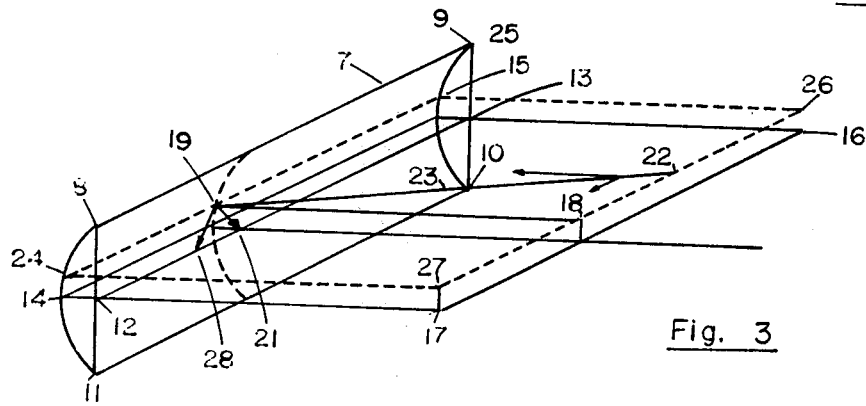
Fig. 4

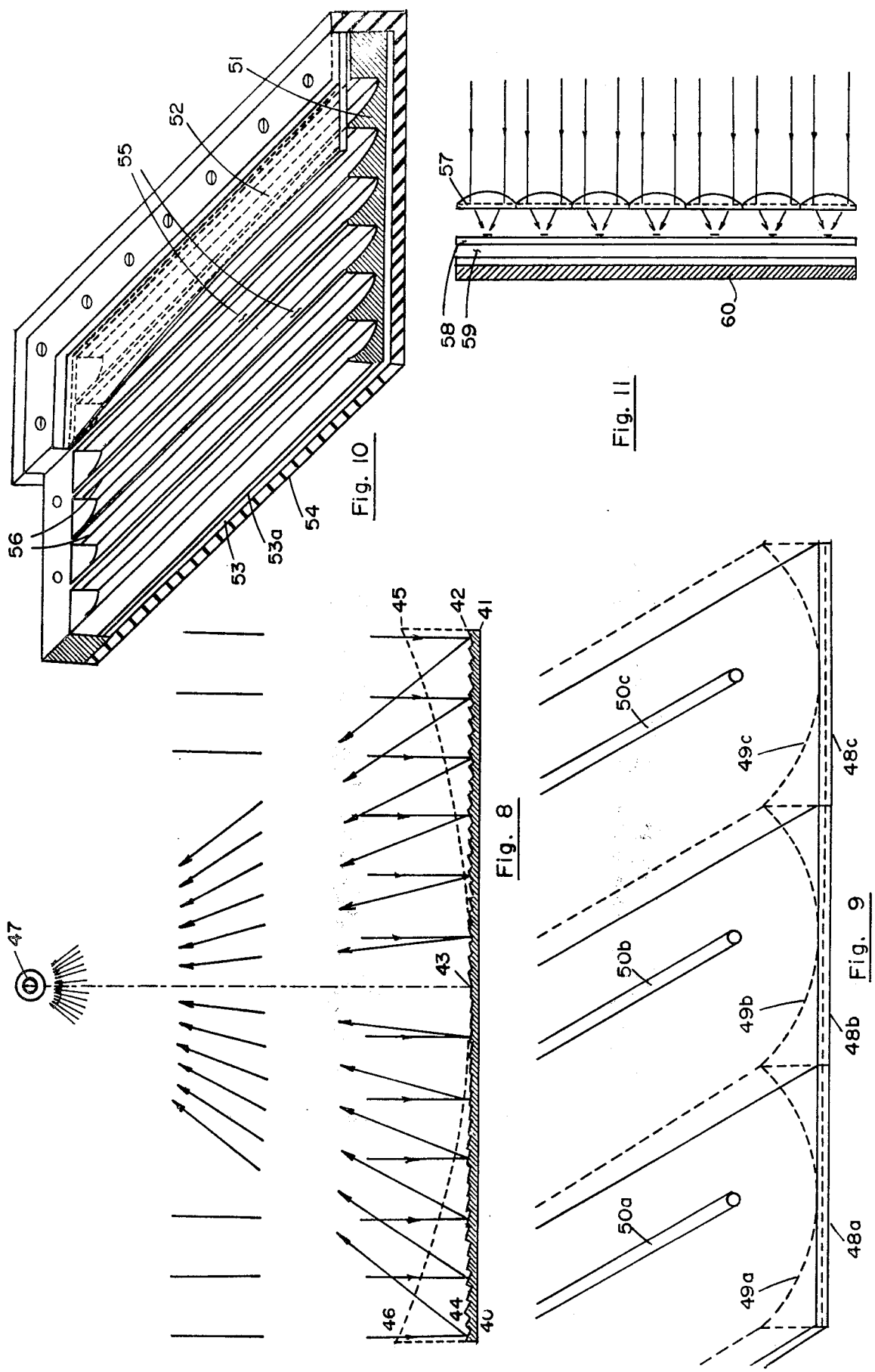

METHOD AND APPARATUS FOR TRACKING THE SUN FOR USE IN A SOLAR COLLECTOR WITH LINEAR FOCUSING MEANS

BACKGROUND OF THE INVENTION

1. Field of Invention

The present invention relates to method and apparatus for tracking the sun for use in focusing solar collectors having one or more linear focusing means, such as cylindrical parabolic or semiparabolic mirrors and linear lenses, regular or Fresnel type.

2. Brief Description of the Prior Art

There are three conventional ways of tracking the sun that are used in solar collectors with linear focusing means, such as cylindrical parabolic or semiparabolic mirrors and linear lenses. The first method is referred to as full tracking and involves two motions — the rotation of a vertical shaft and the tilting of the collector around a horizontal axis. The second method may be referred to as the East-West rotational tracking. In this method, the long axis of the solar collector is located North to South and tilted at an angle so that the long axis is at right angles to the rays from the rising sun, and the front plane of the collector is faced toward the sun. As the sun moves across the sky, the collector is rotated around a central shaft parallel to the long axis so that the front plane of the collector is always at right angles to the sun. As the season changes, the long axis of the collector is shifted daily or weekly so that the long axis is always at right angles to the rising sun. The third method may be referred to as the North-South rotational tracking. In this method, the long axis of the collector is located horizontally East to West and is rotated North to South so that the focus of the collector coincides with the receiver throughout its length.

It is noted that in these conventional methods of tracking, the front plane of the solar collector does not remain on the same plane. A norm to the front plane changes both its altitude angle relative to the horizontal plane and its azimuth angle relative to due south. A characteristic feature of the tracking method of the present invention is that the front plane of the collector remains on the same plane.

BRIEF DESCRIPTION OF THE PRESENT INVENTION

The present invention introduces a simple coplanar rotational method for tracking the sun for use in a focusing solar collector that comprises of one or more linear focusing means, such as cylindrical parabolic or semiparabolic mirrors and linear lenses. A linear focusing means has a linear focal region, and a normal axis direction may be associated with the focusing means. Sun's rays that fall on the linear focusing means in the direction parallel to the normal axis direction are converged toward the linear focal region. A sun's ray that falls on the linear focusing means in a direction non-parallel to the normal axis may be decomposed into two components — a component parallel to the normal axis and the other perpendicular to the normal axis. The coplanar rotational tracking of the sun is accomplished by rotating the solar collector around an axis parallel to the normal axis such that the component of the sun's ray that is perpendicular to the direction of the normal axis becomes parallel to the direction of the linear focal region. In this way, sun's rays that are not parallel to the normal axis are still directed to the linear focal regions of the solar collector, and their linear extension thereof. It is noted that the linear focal region of a linear focusing means is parallel to the linear axis of the focusing means, and the normal axis is perpendicular to the front plane of the solar collector. It is important to note that the front plane of the solar collector remains on the same plane during the tracking operation.

BRIEF DESCRIPTION OF THE DRAWINGS

FIGS. 1a through 1c illustrate the East to West tracking as used in a cylindrical parabolic solar collector.

FIGS. 2a and 2b illustrate the North to South tracking as used in a cylindrical parabolic collector, FIG. 3 illustrates a cylindrical parabolic solar collector and is used to define the normal axis, the linear focal region, the focal plane, and to show the optical path of a sun's ray parallel to the normal axis, and the optical path of a sun's ray that is on a plane parallel to the focal plane but is not parallel to the normal axis.

FIGS. 4, 5 and 6 illustrate the coplanar rotary tracking. FIG. 4 shows that the coplanar tracking method may be applied to a solar collector with many linear focal regions that is placed on the ground. FIGS. 5 and 6 show that the coplanar tracking method may be applied to solar collectors placed on the roof and walls of a building.

FIGS. 7, 8, 9, 10 and 11 show various solar collectors with linear focal regions to which the coplanar rotational tracking method can be applied. FIG. 7 illustrates a solar collector with multitude of cylindrical parabolic mirrors. FIG. 8 illustrates a solar collector with multiple-step reflector surfaces. FIG. 9 illustrate a solar collector with several component mirrors, each consisting of multiple-step reflector surfaces. FIG. 10 illustrates a solar collector with multitude of linear mini-semiparabolic mirrors. FIG. 11 illustrates a solar collector with multitude of linear lenses.

DESCRIPTION OF PREFERRED EMBODIMENTS OF THE INVENTION

Figure 7:
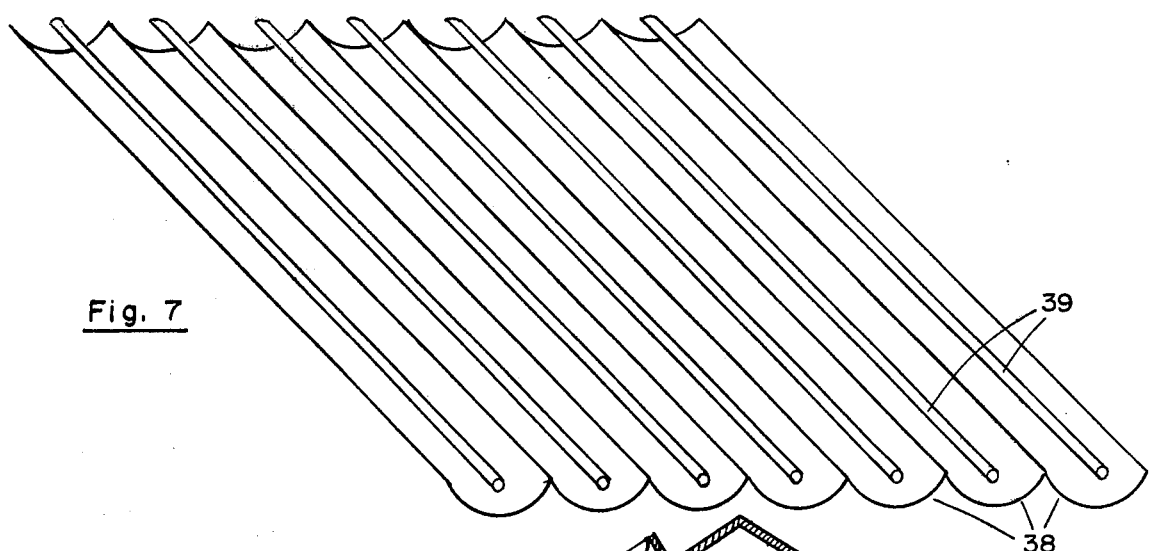

FIGS. 1a through 1c illustrate a cylindrical parabolic solar collector adopting the conventional East-West rotational tracking method. In this method, the long axis 2 of the solar collector 1 is located North to South and tilted at an angle $\theta$ from the horizontal plane so that the long axis is at right angles to the rays from the rising sun, and the front plane 1a-1b-1c-1d of the collector is faced toward the sun. As the sun moves across the sky, the collector is rotated around a central shaft parallel to the long axis so that the front plane of the collector is always at right angles to the sun. As the season changes, the long axis of the collector is shifted so that the long axis is always at right angles to the rising sun. It is important to note that the front plane of the solar collector does not remain on the same plane throughout this East-West rotational tracking operation.

FIGS. 2a and 2b illustrates a cylindrical parabolic solar collector adopting the North-South rotational tracking method. In this method, the long axis 5 of the solar collector 4 is located horizontally East to West and is rotated around an axis 6 parallel to the long axis of the collector so that the focus of the collector coincides with the receiver throughout its length. It is again noted that the front plane of the solar collector does not remain on the same plane throughout this North-South rotational tracking operation.

FIG. 3 illustrates a cylindrical parabolic mirror 7 and is used to illustrate the terminologies used in this specification. The collector has a front plane 8-9-10-11, a linear focal region 12-13, a focal plane 14-15-16-17, the normal axis direction 20-21. It shows that, when a sun's ray 18-19 that is parallel to the normal axis direction 20-21 intercepted by the collector, it is reflected and directed toward a point 21 on the linear focal region 12-13. The focal plane 14-15-16-17 is defined as the plane that contains the linear focal region 12-13 and is parallel to the normal axis direction. The figure also shows that a sun's ray 22-23-19 that is not parallel to the normal axis but is contained within a plane 24-25-2-6-27 that is parallel to the focal plane is intercepted, reflected and directed toward a point 28 on the linear focal region 12-13. It is noted that the linear focal region is parallel to the long axis of the cylindrical parabolic collector, and both the normal axis and the focal plane are perpendicular to the front plane of the collector. The sun's ray 22-23 that is on the plane 24-25-2-6-27 and is not parallel to the normal axis 20-21, may be decomposed into two components — the first component is parallel to the normal axis and the second component is perpendicular to the normal axis. In a successful tracking operation, the second component has to be made parallel to the linear focal region of the solar collector.

FIG. 4 illustrates the front view of a solar collector 29 with many parallel and linear focusing means. The direction of the linear focal regions of the focusing means are shown by parallel lines 30. The region enclosed by two neighboring lines 30 represents a linear focusing means. The figure illustrates the coplanar rotatory tracking of the sun. Referring to the figure, when the sun's rays fall on the collector in the direction illustrated by rays 31, 32 and 33, the rays may be decomposed into components 31a, 32a, and 33a that are parallel to the normal axis and components 31b, 32b and 33b that are perpendicular to the normal axis. When the collector is rotated, while maintaining the front plane on the same plane, so that the components 31b, 32b and 33b become parallel to the direction of the linear focal regions, the incident rays become parallel to the focal planes and the reflected rays are directed to points on the linear focal regions.

It is noted that the cost of installing a solar collector incorporating the coplanar tracking method is very low, because it is possible to install on an existing plane such as the ground, a roof and a wall. Because of the coplanar nature of the tracking motion, only simple and light weight supporting structures are needed to hold the collector in place.

Figure 5:
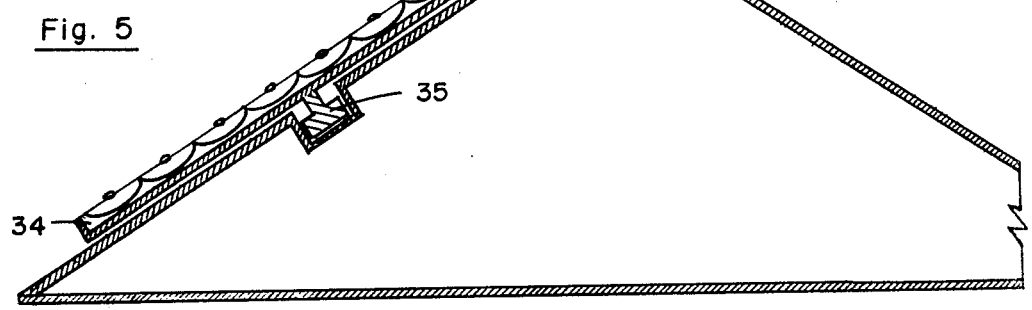
Figure 6:
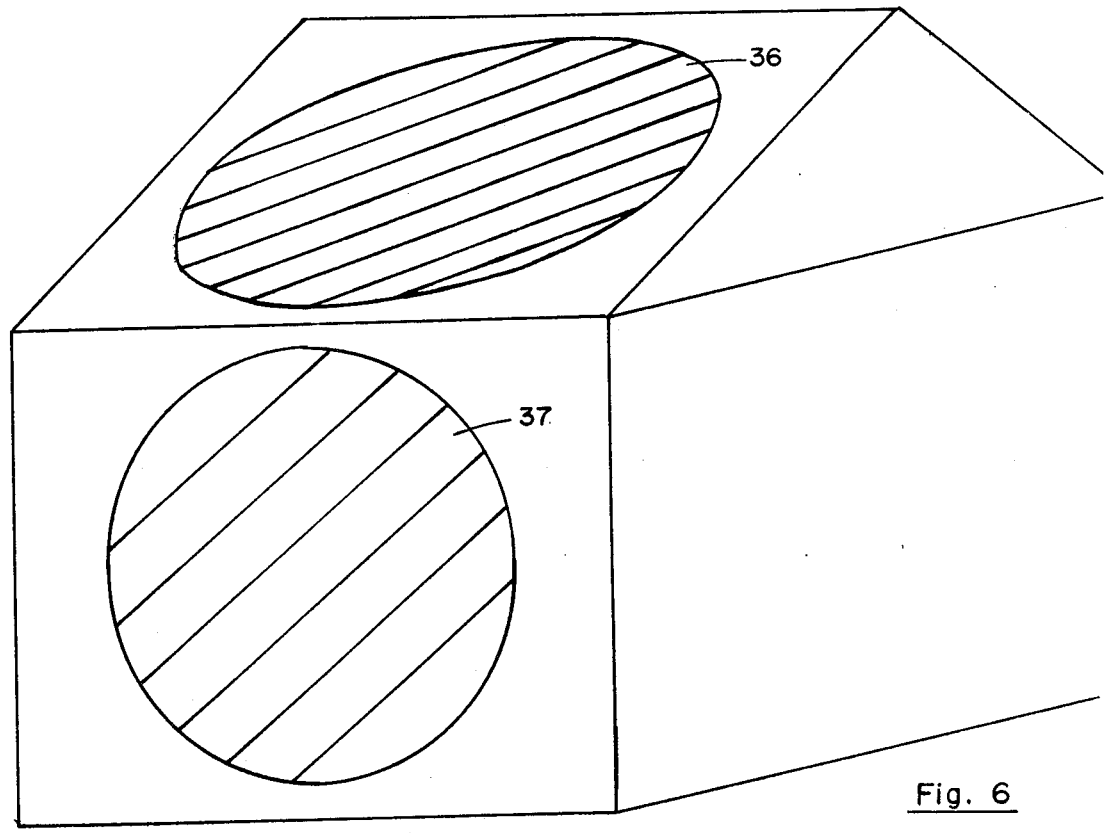

FIG. 4 may be considered as an illustration of a solar collector installed on the ground. FIG. 5 illustrates that a solar collector 34 with multitude of linear focusing means may be installed on a roof and rotated by a motor 35 around a shaft perpendicular to the roof. It is noted that the front surface of the collector remains in a plane parallel to the roof. FIG. 6 illustrates that solar collectors with multitude of linear focusing means 36 and 37 may be installed on a roof and a wall of a house.

It is noted that the coplanar rotational tracking is particularly useful for large solar collectors with many linear focal regions. Some examples of such large solar collectors are illustrated by FIGS. 7, 8, 9, 10 and 11. It is important to note that the supporting structures needed to support such large solar collectors for using the conventional tracking methods are very expensive, and impractical.

FIG. 7 illustrates a large solar collector with many cylindrical parabolic mirrors 38 and heat absorbing tubes 39 located at the linear focal regions of the mirrors. FIG. 8 illustrates a linear multi-step parabolic solar collector having a thin cross section 40-41-42-43-44 that has been introduced by Chen-yen Cheng and Sing-Wang Cheng. The collector has many narrow strips of reflecting surface oriented in such a manner that most of the rays that fall on the collector in the direction parallel to the normal axis are reflected by the narrow strips of reflecting surfaces and directed toward the absorbing tube 47. The solar collector therefore functions as a cylindrical parabolic collector of the cross-section 40-41-45-46. FIG. 9 illustrates a large solar collector having several, three as shown, linear multi-step parabolic solar collectors, 48a, 48b and 48c, with heat absorbing tubes, 50a, 50b and 50c. The solar collector functions as a collector with several cylindrical parabolic reflectors, 49a, 49b and 49c. Very large solar collectors of the designs illustrated by FIGS. 7, 8 and 9 can be made. For such large solar collectors, conventional ways of tracking are certainly impractical. Coplanar rotational tracking of the present invention is the best way for such large solar collectors.

FIG. 10 illustrates a panel solar collector that has been introduced by Chen-yen Cheng and Sing-Wang Cheng. It comprises of an integrated reflector-heat sink plate 51, a transparent cover 52, a conduit for passing a heat absorbing medium 53, a layer of insulation 54. The integrated reflector-heat sink plate 51 comprises of many linear semi-parabolic reflector surfaces 55 and linear heat sink regions 56 located at the linear focal regions of the reflector surfaces. The space between the transparent cover plate 52 and the integrated reflector-heat sink plate 51 is evacuated to reduce heat loss from the front side of the collector. By using the coplanar rotational tracking method, the sun's rays that pass through the transparent cover are reflected and directed to the linear heat sink regions and the energy of the rays is converted into heat energy. The heat energy is conductively transmitted to the heat transfer surface 53a that is in contact with the heat absorbing medium and transmitted to the heat absorbing medium. The solar collector illustrated can be conveniently installed on the roof and walls of a house in the way illustrated by FIGS. 5 and 6.

FIG. 11 illustrates a solar collector which comprises of an integrated converging lens plate 57, a heat sink plate 58, a conduit for carrying a heat absorbing medium 59, and means for insulating the unit 60. The integrated converging lens plate contains many linear focusing lens of relatively short focal length and these lenses are integrated to form a continuous plate. The first surface of the heat sink plate has many miniature linear heat sink areas with high absorptivities and the remaining part, which is the major part of the first surface, is a reflective surface. In use the linear heat sink regions have to be at the linear focal regions of the focusing lenses. The heat generated in the heat sink regions is transferred to the heat absorbing medium through the heat sink plate. The coplanar rotational tracking method may be used for this type of solar collector provided that the distance between the lens plate and the heat sink plate be adjusted as the angles of the sun's rays incident to the front surface of the collector change.

What we claim as our invention and desire to secure by Letters Patent is:

1. A method of tracking the sun for use in a solar collector having a linear focusing means and a linear focal region, the linear focusing means being so constructed that sun's rays that fall on the solar collector in the direction that is perpendicular to a front reference plane are directed toward the linear focal region, comprising rotating the solar collector around an axis that is perpendicular to the front reference plane and adjusting the angle of rotation so that a sun's ray incident on the solar collector has a first component perpendicular to the front reference plane and a second component parallel to the front reference plane, the second component being substantially parallel to the direction of the linear focal region.

2. A method of tracking the sun for use in a solar collector having plurality of linear focusing means, each having its linear focal region, the linear focusing means being so arranged that the linear focal regions are substantially parallel to each other and that sun's rays that fall on the solar collector in the direction perpendicular to a front reference plane are directed by the linear focusing means to their respective linear focal regions, comprising rotating the solar collector around an axis that is perpendicular to the front reference plane and adjusting the angle of rotation so that a sun's ray incident on the solar collector has a first component perpendicular to the front reference plane and a second component parallel to the front reference plane, the second component being substantially parallel to the direction of the linear focal regions.

3. An apparatus for tracking the sun for use in a solar collector having a linear focusing means and a linear focal region, the linear focusing means being so constructed that sun's rays that fall on the solar collector in the direction that is perpendicular to a front reference plane are directed toward the linear focal region, comprising means for rotating the solar collector around an axis perpendicular to the front reference plane so that a sun's ray incident on the solar collector has a first component perpendicular to the front reference plane and a second component parallel to the front reference plane, the second component being substantially parallel to the direction of the linear focal region.

4. An apparatus for tracking the sun for use in a solar collector having multitude of linear focusing means, each having its linear focal region, the linear focusing means being so arranged that the linear focal regions are substantially parallel to each other and that sun's rays that fall on the solar collector in the direction perpendicular to a front reference plane are directed by the linear focusing means to their respective linear focal regions, comprising means for rotating the solar collector around an axis perpendicular to the front reference plane so that a sun's ray incident on the solar collector has a first component perpendicular to the front reference plane and a second component parallel to the front reference plane, the second component being substantially parallel to the direction of the linear focal regions.

* * * * *